US010249151B2

(12) United States Patent
Lacaze et al.

(10) Patent No.: US 10,249,151 B2
(45) Date of Patent: *Apr. 2, 2019

(54) CANINE HANDLER OPERATIONS POSITIONING SYSTEM

(71) Applicants:Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

(73) Assignee: Robotic Research, LLC, Gaithersburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,569

(22) Filed: May 13, 2017

(65) Prior Publication Data

US 2017/0249809 A1    Aug. 31, 2017

Related U.S. Application Data

(63) Continuation of application No. 15/159,469, filed on May 19, 2016, now Pat. No. 9,666,038, which is a
(Continued)

(51) Int. Cl.
*H04W 4/02* (2018.01)
*G01C 21/28* (2006.01)
(Continued)

(52) U.S. Cl.
CPC ............... *G08B 1/08* (2013.01); *F41H 13/00* (2013.01); *G01C 21/28* (2013.01); *G01S 19/45* (2013.01);
(Continued)

(58) Field of Classification Search
None
See application file for complete search history.

(56) References Cited

U.S. PATENT DOCUMENTS

| 2005/0182518 A1* | 8/2005 | Karlsson | G05D 1/0246 700/253 |
| 2008/0077326 A1* | 3/2008 | Funk | G01C 21/165 701/500 |
| 2009/0276154 A1* | 11/2009 | Subramanian | G01C 21/20 701/469 |

* cited by examiner

*Primary Examiner* — Jonathan M Dager
*Assistant Examiner* — Garrett F Evans
(74) *Attorney, Agent, or Firm* — White-Welker & Welker, LLC; Matthew T. Welker, Esq.

(57) ABSTRACT

The Canine Handler Operations Positioning System (the Inventors) taught by the present invention consists of one or more dog-worn sensor, one or more handler's shoe-worn sensor, and algorithms for maintaining localization of units of canines and handlers traveling in GPS and GPS-denied areas. The present invention adapts the localization algorithms from the human-based system to dogs, increase performance, reduce SWAP, and further refine the system based on user feedback. The human worn system is modified for the human handler for maximum operational practicality in regard to batteries, size, and interoperability to a radio. The Canine Handler Operations Positioning System (the Inventors) focuses on developing the dog-worn positioning system, modifying the handler's positioning sensor if needed, and integrating the system with an OCU. The complete the Inventors system would provide a positioning solution for both the dog(s) and handler(s).

15 Claims, 4 Drawing Sheets

Related U.S. Application Data continuation of application No. 13/958,536, filed on Aug. 3, 2013, now Pat. No. 9,372,088.

(60) Provisional application No. 61/679,355, filed on Aug. 3, 2012.

(51) Int. Cl.

| | |
|---|---|
| *G06T 7/285* | (2017.01) |
| *G06T 7/20* | (2017.01) |
| *G08B 1/08* | (2006.01) |
| *G01S 19/45* | (2010.01) |
| *F41H 13/00* | (2006.01) |
| *G01S 19/47* | (2010.01) |

(52) U.S. Cl.
CPC ................ *G01S 19/47* (2013.01); *G06T 7/20* (2013.01); *G06T 7/285* (2017.01); *G06T 2200/08* (2013.01); *G06T 2207/10021* (2013.01); *G06T 2207/10032* (2013.01); *G06T 2207/30212* (2013.01); *H04W 4/023* (2013.01)

CANINE HANDLER OPERATIONS POSITIONING SYSTEM

CROSS REFERENCE TO RELATED APPLICATIONS

This application is a continuation patent application (CPA) of U.S. patent application Ser. No. 15/159,469 entitled "Canine Handler Operations Positioning System", filed on May 19, 2016. The benefit under 35 USC § 120 of the United States provisional application is hereby claimed, and the aforementioned application is hereby incorporated herein by reference.

U.S. patent application Ser. No. 15/159,469 is a continuation of U.S. patent application Ser. No. 13/958,536 entitled "System and Method for Urban Mapping and Positioning", filed on Aug. 3, 2013 and issued as U.S. Pat. No. 9,372,088.

U.S. patent application Ser. No. 13/958,536 claims priority from U.S. patent application Ser. No. 61/679,355, entitled "System and Method for Urban Mapping and Positioning", filed on Aug. 3, 2012. The benefit under 35 USC § 119(e) of the United States provisional application is hereby claimed, and the aforementioned application is hereby incorporated herein by reference.

TECHNICAL FIELD OF THE INVENTION

This invention relates to a canine handler operations positioning system for use in military applications. In particular, the invention relates to the use of a canine handler operations positioning system that consists of one or more dog-worn sensors, one or more handler's shoe-worn sensors, and algorithms for maintaining localization of units of canines and handlers traveling in GPS and GPS-denied areas.

BACKGROUND OF THE INVENTION

Dogs are used by Special Operations Forces for a variety of Intelligence, Surveillance, and Reconnaissance missions. In IED missions, a dog may be sent into a tunnel, building, or human-inaccessible space. To make matters more difficult, the task may be performed in GPS-denied areas. When a canine is sent off on its own, the operator has limited knowledge of the dog's precise path, location, or status (e.g., the dog has pause for significant periods of time). In addition to IED/EOD operations, other SOCOM missions make extensive use of dogs; pursuit of a suspect, rescue missions, guarding activities, and searching for other objects or persons-of-interest. Accurate localization is beneficial in all of these missions.

The United States Military has developed special equipment for their working dogs, including a special camera system that is incorporated into vests worn by combat dogs. The dogs take over a year and $60,000 to train. Dogs can out-smell any human and most mechanical sensing devices while possessing excellent mobility capabilities. A major limiting factor is the canine's lack of communication. Mission efficacy and success will increase by knowing the location of the dog in real-time. When a canine discovers an object of interest (e.g., contraband or wounded personnel), having precise knowledge of the dog's position makes achieving follow-on objectives quicker, thus saving lives. Additionally, the ability to find a wounded/trapped dog will save a valued asset.

Therefore, what is needed is a canine handler operations positioning system that consists of one or more dog-worn sensors, one or more handler's shoe-worn sensors, and algorithms for maintaining localization of units of canines and handlers traveling in GPS and GPS-denied areas.

DEFINITIONS

GPS stands for Global Positioning System, is a radio navigation system that allows land, sea, and airborne users to determine their exact location, velocity, and time 24 hours a day, in all weather conditions, anywhere in the world.

GPS-denied areas are defined as land, sea, and airborne locations that are unable to receive a radio signal for GPS navigation.

AUGV is defined as an Autonomous Unmanned Ground Vehicle.

DTED (or Digital Terrain Elevation Data) is a standard of digital datasets which consists of a matrix of terrain elevation values.

LIDAR (Light Detection And Ranging, also LADAR) is an optical remote sensing technology that can measure the distance to, or other properties of, targets by illuminating the target with laser light and analyzing the backscattered light. LIDAR technology has applications in geomatics, archaeology, geography, geology, geomorphology, seismology, forestry, remote sensing, atmospheric physics, airborne laser swath mapping (ALSM), laser altimetry, and contour mapping.

EO image is an image created or provided from an earth observatory.

Soldiers are defined as military wearers of the present invention.

Handlers are military soldiers or non-military wearers of the present invention. Handlers and Soldiers can be used interchangeably in this document, as they are simply the human wearers of the present invention.

SUMMARY OF THE INVENTION

The Canine Handler Operations Positioning System (the Inventors) taught by the present invention consists of one or more dog-worn sensor, one or more handler's shoe-worn sensor, and algorithms for maintaining localization of units of canines and handlers traveling in GPS and GPS-denied areas. The present invention adapts the localization algorithms from the human-based system to dogs, increase performance, reduce SWAP, and further refine the system based on user feedback. The human worn system is modified for the human handler for maximum operational practicality in regard to batteries, size, and interoperability to a radio. The Canine Handler Operations Positioning System (the Inventors) focuses on developing the dog-worn positioning system, modifying the handler's positioning sensor if needed, and integrating the system with an OCU. The complete the Inventors system would provide a positioning solution for both the dog(s) and handler(s).

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
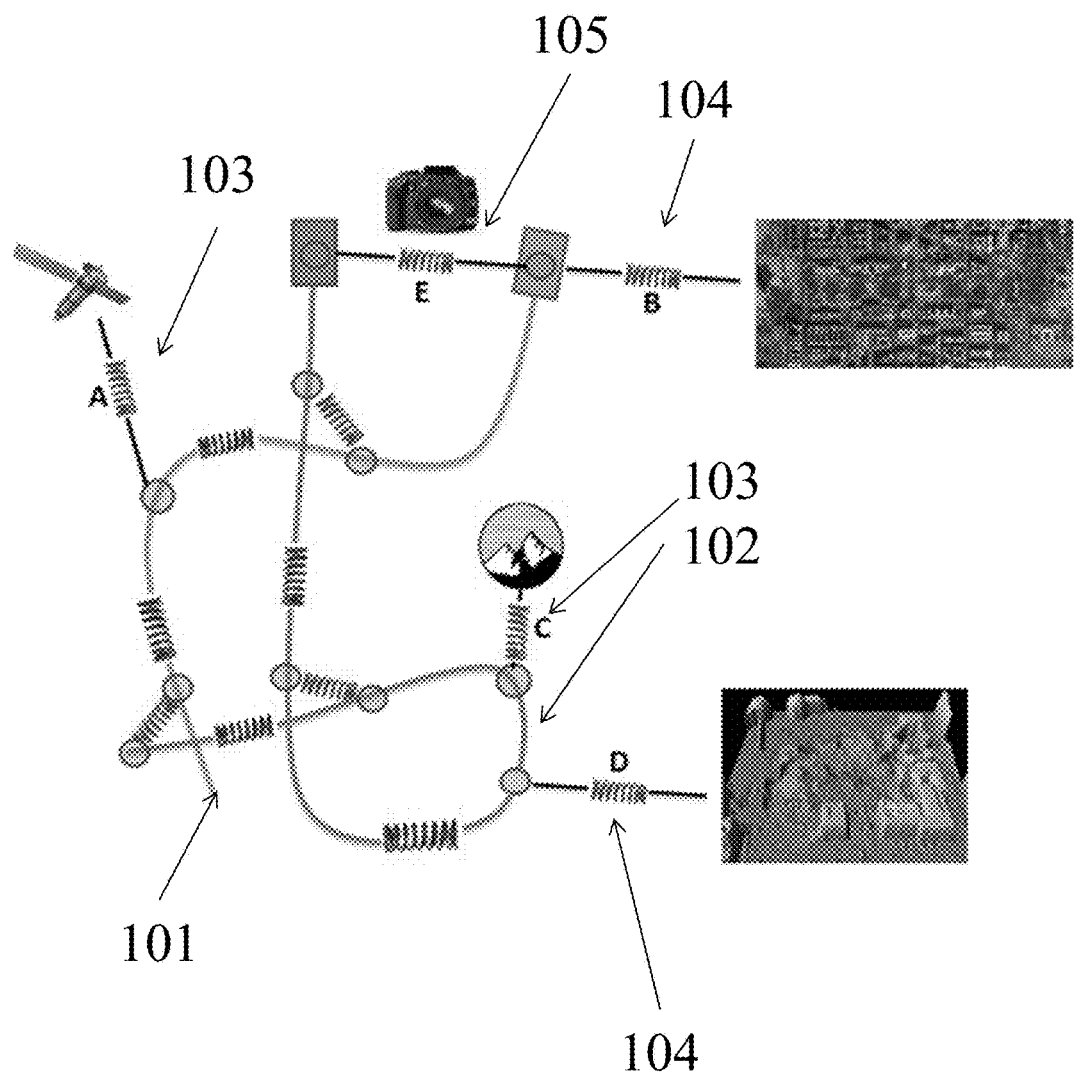
FIG. 1 is a conceptual example of the network proposed for increase positioning accuracy for robots, personnel, and canines.

UMAPS is a multifaceted system that can be robot-mounted, human-worn, or canine carried 301. UMAPS produces real-time, 3D mapping and localization for the user as they move throughout a GPS-denied environment 302 (e.g. buildings, caves, or tunnels). An Operator Control Unit (OCU) displays information collected by UMAPS; 2D floorplans; 3D textured-enriched surfaces of the structure's interior; and the location of the users within that structure 303. UMAPS has an open architecture that allows it to function with any OCU 304. UMAPS has three distinct subsystems: obstacle maps for robot mobility, mapping, and positioning 305 as shown in FIG. 1.

These subsystems can be combined to provide products that address specific military needs. For example, one capability that can be produced is UMAPS-Positioning (UMAPS-P), which provides GPS-denied position estimation for human users 307. The applications of such technology include localization within a building and exploration of tunnels with a quick determination of the position of each squad member. Another capability is for a human-worn mapping component of UMAPS that can provide increased situational awareness for command and control, identify unexplored regions of a building, and provide advanced intelligence for warfighters 306. A third capability allows mapping to be generated from a robotic platform, providing critical 3-D survey information of remote, enclosed or dangerous spaces without compromising human presence or safety. A fourth capability allows the determination of canine unit positioning relative to its mission objective 308.

As a result of testing, the UMAPS positioning subsystem improvements over the initial concept included integrating GPS with the inertial navigation system for better global accuracy.

In other embodiments the mapping prototype was adapted for mounting on a backpack and a robotic platform.

The information from multiple localization methods will be fused by creating a "spring" network among different updates, using the springs to "pull" the navigation solutions to a more accurate location. The strength of each spring will be determined by the confidence of the update 309. This type of architecture was originally developed by RR and used on the UMAPS program to fuse the relative localization solution of multiple INS systems strapped to dismounted soldiers. As the soldiers explored the GPS-denied area, their INS navigation solution was sent to an OCU 323. If the soldiers met at a "rendezvous" location, this was sent to the OCU which then created an infinitely tight spring between their navigation solutions at that time, essentially locking them into the same place 310. Looser springs existed along each of their relative solutions in order to keep the general shape of the path that they took 311. Springs also existed to absolute positions, which were either surveyed points that the soldiers tagged (infinitely tight springs) or GPS updates when available (somewhat looser springs) 312.

In an alternative embodiment, this same framework will be used by the proposed system, but instead of tagging "rendezvous" points to fuse multiple relative solutions, the system will use absolute position "springs" to pull the overall solution toward the updates 313.

The UMPAS system developed by the inventors is currently capable of maintaining localization in GPS-denied areas with accuracies better than 1% of distance traveled without calibrating for a particular person. This capability is achieved by performing zero velocity updates at each footfall, in turn eliminating the accelerometer errors 315. Through a system of clever synchronization between multiple localization units and group filtering, the system is capable of maintaining very accurate relative positions between separate units 316. The same advantages can be extended for canines. The handler and the canine will synchronize their units (telling the group filtering systems that they are in close proximity); this action eliminates errors in the relative position of the pair. Further synchronizations will continue adjusting heading and position of the team 317.

The present invention extends and refines the positioning technology developed under the UMAPS programs specifically for the dog localization case. This work includes system and manufacturing engineering, system integration, algorithm refinement, and further refinement, and identification of suitable sensors. The specific type and size of the dog will be determined with help from the sponsor.

The present invention adapts the localization algorithms from the human-based system to dogs, increase performance, reduce SWAP, and further refine the system based on user feedback. The human worn system is modified for the human handler for maximum operational practicality in regard to batteries, size, and interoperability to a radio.

The Canine Handler Operations Positioning System (the Inventors) taught by the present invention consists of one or more dog-worn sensor, one or more handler's shoe-worn sensor, and algorithms for maintaining localization of units of canines and handlers traveling in GPS and GPS-denied areas 318. The handler and the canine will synchronize their units (telling the group filtering systems that they are in close proximity); this action eliminates errors in the relative position of the pair. Further synchronizations will continue adjusting heading and position of the team.

The Canine Handler Operations Positioning System (the Inventors) focuses on developing the dog-worn positioning system, modifying the handler's positioning sensor if needed, and integrating the system with an OCU. The complete the Inventors system would provide a positioning solution for both the dog(s) and handler(s).

In order to have groups of autonomous (or semi-autonomous) mobility systems capable of providing distributed and networked Intelligence, Surveillance, and Reconnaissance (ISR) 319, there are three main components needed: (1) Accurate relative localization (know where each platform is in relation to other platforms) 320; (2) a variety of situation awareness tools to make the operational information collected from the platform sensors useful to the team members 321; and (3) when human/robot teams are working and moving together, an ability to localize and interface between humans and robots (to know where each other is located) 322. This effort is for improving the localization for collaborative ISR autonomous unmanned systems and humans, (with/without GPS), customizing and hardening the autonomous capabilities for SOCOM mission sets, and extensive testing with appropriate unmanned vehicles and human and canine team members in military relevant SOF mission scenarios.

The technology for an autonomous or semi-autonomous mobility system has reached a maturity that now requires customization and testing in a SOF mission-set environment. As stated in the abstract, there are three areas that must be addressed to meet these needs: (1) Accurate platform localization, (2) Situation Awareness (SA) tools and (3) team positioning.

The information from multiple localization methods will be fused by creating a "spring" network among different updates, using the springs to "pull" the navigation solutions to a more accurate location. The strength of each spring will be determined by the confidence of the update 314. This type of architecture was originally developed by RR and used on the UMAPS program to fuse the relative localization solution of multiple INS systems strapped to dismounted soldiers. As the soldiers explored the GPS-denied area, their INS navigation solution was sent to an OCU. If the soldiers met at a "rendezvous" location, this was sent to the OCU which then created an infinitely tight spring between their navigation solutions at that time, essentially locking them into the same place. Looser springs existed along each of their relative solutions in order to keep the general shape of the path that they took. Springs also existed to absolute positions, which were either surveyed points that the soldiers tagged (infinitely tight springs) or GPS updates when available (somewhat looser springs). This same framework will be used by the Inventors, but instead of tagging "rendezvous" points to fuse multiple relative solutions, the system will use absolute position "springs" to pull the overall solution toward the updates.

FIG. 1 shows a conceptual example of how the spring network will work. The first path 101 and second paths 102 are two separate runs by the AUGV. The AUGV will compute its relative localization solution using its inertial sensors and available odometry. At Spring A 103 in the figure during the first run 101, the AUGV may get a poor GPS update, so it inserts a weak spring into the network, slightly pulling its path toward that solution. At the end of the run, it inserts Spring B 104 by registering some local sensor data to aerial imagery. The registration algorithm reports high confidence, so the spring is strong. Since it has a confident absolute position solution, it geo-tags some local sensor data and stores it for a future run. During the next, second run 102, the AUGV is able to register its position to some DTED data because of a unique change in elevation and inserts Spring C 103. Nearby, Spring D 104 is inserted by registering the local LIDAR sensor data to some aerial LIDAR in a stored database. At the end of the second run 102, it registers some local features from an EO image to data from the previous run and inserts a strong Spring E 105 that pulls it to the same endpoint. These springs allow each absolute localization method to provide a weight or confidence level to affect how much the overall solution gets corrected. Infinitely strong springs perform a sort of "localization reset."

The concept of springs as discussed above is solved using least squares of the form $Ax=b$, where A characterizes the springs, b quantifies the strength of the spring, and x are the offsets applied to the navigation solutions. For non-square matrix A, the naïve approach to solve this least squares problem is $x=(A^TA)^{-1}A^Tb$, which is called the normal equation. However, this approach is computationally expensive and numerically unstable (for some choices of A) because of the required matrix inversion.

In practice, least squares problems are solved with an algorithm such as QR factorization. In its simplest form, QR factorization is a transformation on the matrix A such that $A=QR$, where Q is orthonormal (i.e., $Q^TQ=I$) and R is upper triangular. Substituting this factorization into the normal equation above, we find $x=(A^TA)^{-1}A^Tb=((QR)^TQR)^{-1}(QR)^Tb=(R^TQ^TQR)^{-1}R^TQ^Tb=(R^TR)^{-1}R^TQ^Tb=R^{-1}Q^Tb$. The normal equation simplifies to $Rx=Q^Tb$, which can be efficiently solved with a single matrix multiply and a linear equation solver.

Now that the use of QR factorization has been justified, there is now a question of how to efficiently solve the QR factorization of a matrix, preferably in a distributed form. One method to solve a QR factorization is called Householder QR. In Golub and Loan, the Householder QR algorithm is defined for a general matrix. Without copying the algorithm here, one key feature to note is that a Householder transformation on row j affects only rows in A with below diagonal, non-zero entries in that column. This fact is the key to solving the distributed QR factorization for this problem.

Figure 2:
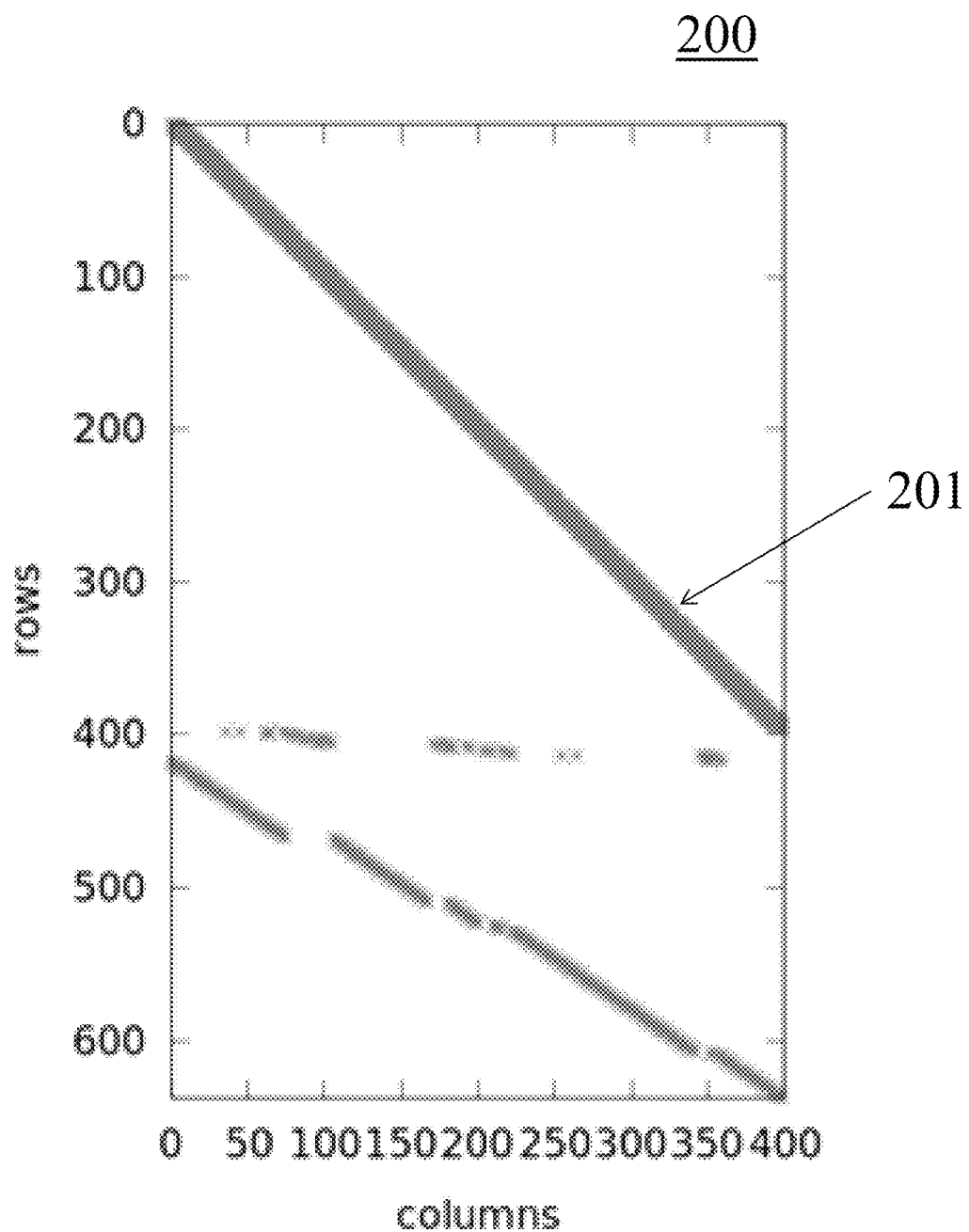
FIG. 2 is a visualization of a real matrix used to solve a spring problem.
Figure 3:
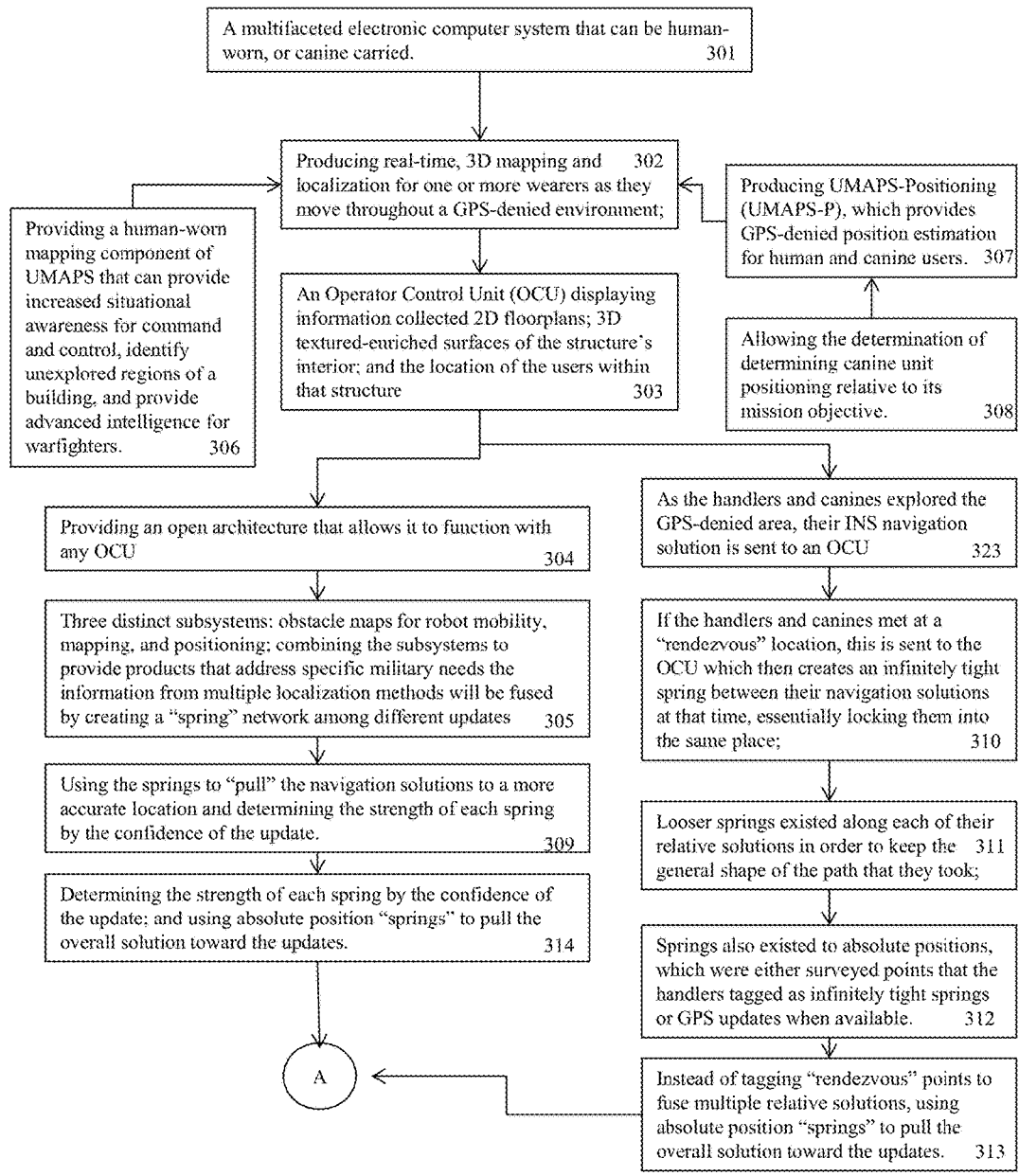
FIGS. 3-4 are flow charts illustrating the method for the canine handler operations positioning system of the present invention.
Figure 4:
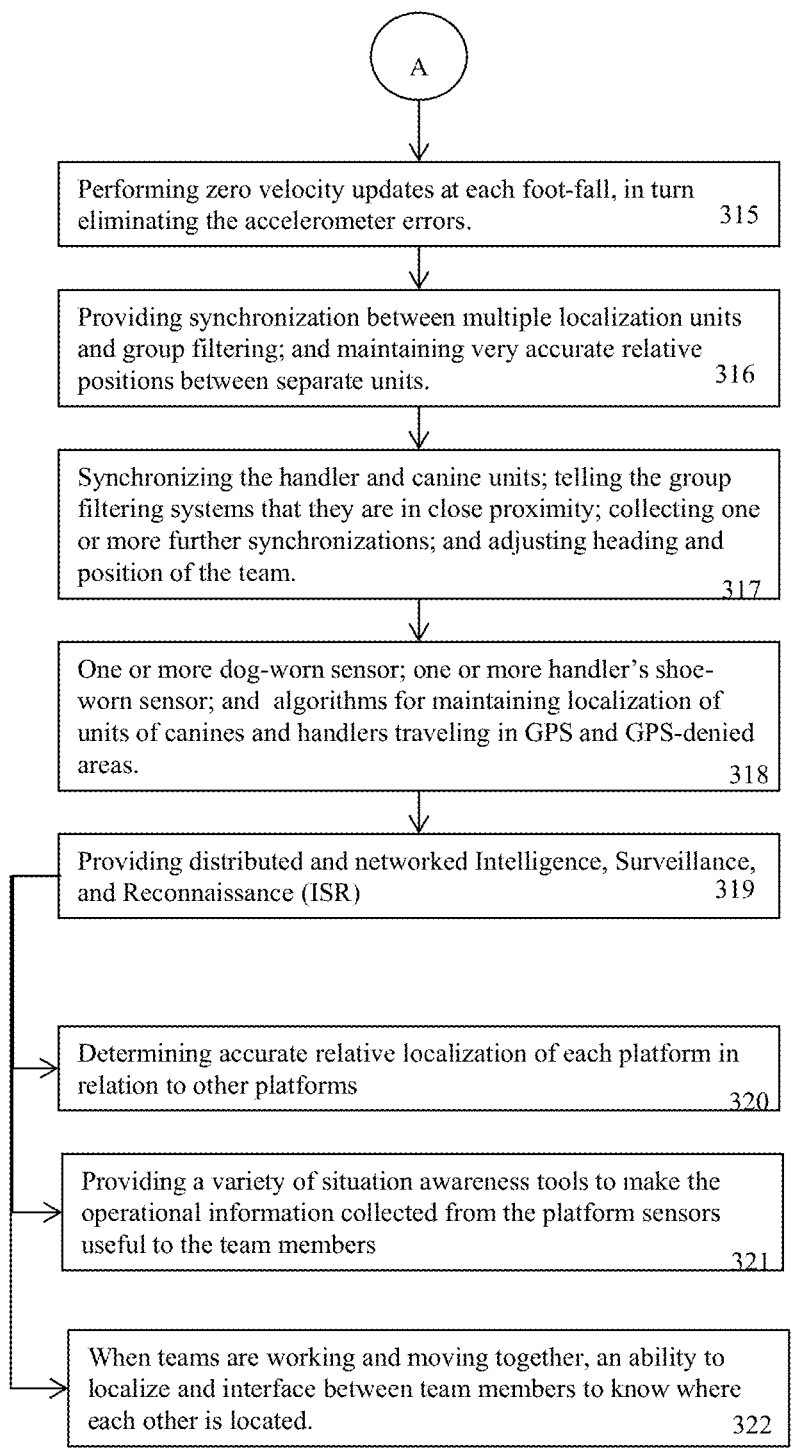

The matrix A 200 for which we are solving is block lower triangular, as shown in FIG. 2. Since many of the entries below the diagonal 201 are already zero, much of the Householder transformations can be simplified and broken into separate problems. Lu and Barlow define the algorithm to do this factorization. The basis of this work is on analyzing the structure of the matrix A and how to divide it up into sub-problems. This analysis is performed with column intersection graphs, which link two columns that have at least one non-zero entry in both rows. Column intersection graphs are then transformed into elimination trees, identifying sub-problems that can be computed by different processing units. For brevity, the entirety of Lu and Barlow's work is not presented here.

An important component of the present invention is that the relative localization of handlers and canines is performed with collective filtering techniques. In other words, the relative position of each handler and canine is known very accurately (within a couple of meters). ISR is not an independent component of the mission, relative location of events with respect to other team members becomes one of the most important aspects of the mission.

An accurate relative localization solution can greatly enhance the performance of any absolute localization method for several reasons. First, it can reduce the search space of the method when trying to register local sensors against a priori databases. Second, many of the matching algorithms use a gradient descent method, which will converge to a correct local minimum faster if seeded with a better starting point. Finally, it can be used to filter out erroneous absolute estimates. If the relative localization solution thinks the handler or canine has only traveled 20 meters from its last absolute position update, but an absolute localization method reports an update a mile away, the update is likely to be an error.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for canine handler operations positioning comprising
    determining a position of one or more canines in GPS-denied areas;
    relaying a position of the canine, a 2D map, a 3D map, a floor map, or a texture map of the area traversed by the canine, to an operator controlled unit, or incident commander;
    providing a multifaceted electronic computer system that can be human-worn, or canine carried;
    affixing the electronic computer system to one or more human handlers;
    affixing the electronic computer system to one or more canines;
    collecting audio and visual information from one or more wearers as they move throughout a GPS-denied environment;
    producing real-time, 3D mapping and localization for the one or more wearers as they move throughout the GPS-denied environment from the collected information;
    providing an Operator Control Unit (OCU) displaying the information collected 2D floorplans; 3D textured-enriched surfaces of a structure's interior; and location of the users within that structure;
    providing an open architecture that allows the multifaceted electronic computer system to function with an OCU;
    creating a spring network among different updates; and
    using the springs to pull a navigation solution to a more accurate location.

2. The method of claim 1, where the canine is replaced by another animal.

3. The method of claim 1, further comprising the steps of
    producing Urban Mapping and Positioning (UMAPS), and
    providing GPS-denied position estimation for human and canine users.

4. The method of claim 1, further comprising the step of
    providing a human-worn mapping component of Urban Mapping and Positioning (UMAPS).

5. The method of claim 1, further comprising the step of
    determining canine unit positioning relative to the canine units mission objective.

6. A method for canine handler operations positioning comprising
    relaying a position of one or more canines in GPS-denied areas;
    relaying a position of the canine, a 2D map, a 3D map, a floor map, or a texture map of the area traversed by the canine, to an operator controlled unit, or incident commander;
    determining a strength of each spring by a confidence of the update; and
    using absolute position springs to pull an overall solution toward the updates.

7. A method for canine handler operations positioning comprising
    relaying a position of one or more canines in GPS-denied areas;
    relaying a position of the canine, a 2D map, a 3D map, a floor map, or a texture map of the area traversed by the canine, to an operator controlled unit, or incident commander;
    fusing a relative localization solution of multiple INS systems strapped to dismounted handlers;
    generating an INS navigation solution and sending it to an OCU as the dismounted handlers and canines explored the GPS-denied area;
        determining one or more navigation solutions when the dismounted handlers and canines met at a rendezvous time and location;
        sending the navigation solution to the OCU;
        creating a tight spring between the navigation solutions at a rendezvous time and location by the OCU;
        generating one or more looser springs along each canines or handlers relative solutions; and
        generating one or more absolute springs along each canines or handlers relative solutions to absolute positions, which were either surveyed points that the handlers tagged as infinitely tight springs or GPS updates when available.

8. A method for canine handler operations positioning comprising
    relaying a position of one or more canines in GPS-denied areas;
    relaying a position of the canine, a 2D map, a 3D map, a floor map, or a texture map of the area traversed by the canine, to an operator controlled unit, or incident commander; and
    using absolute position "springs" to pull an overall solution toward an updated solution.

9. The method of claim 1, further comprising the step of performing velocity updates at each foot-fall.

10. The method of claim 1, further comprising the steps of
    providing synchronization between multiple localization units and group filtering; and
    maintaining accurate relative positions between separate units.

11. The method of claim 1, further comprising the steps of
    synchronizing a handler and canine units;
    telling a group filtering systems that the handle and canine units are in close proximity;
    collecting one or more further synchronizations; and
    adjusting heading and position of the team.

12. The method of claim 1, further comprising the steps of
    providing one or more dog-worn sensor;
    providing one or more handler's shoe-worn sensor; and
    using algorithms for maintaining localization of units of canines and handlers traveling in GPS and GPS-denied areas.

13. The method of claim 1, the step of
providing a positioning solution for both one or more canines and one or more handlers.

14. The method of claim 1, further comprising the steps of
providing distributed and networked Intelligence, Surveillance, and Reconnaissance (ISR);
determining accurate relative localization of one or more platforms in relation to one or more other platforms; and
providing a variety of situation awareness tools to make an operational information collected from the platform sensors useful to one or more team members.

15. The method of claim 14, further comprising the step of
when one or more teams are working and moving together, localizing and interfacing between the team members to know where each other team member is located.

* * * * *